United States Patent [19]

Payne

[11] Patent Number: 5,050,677

[45] Date of Patent: Sep. 24, 1991

[54] WELL CONSTRUCTION METHOD

[75] Inventor: Frederick C. Payne, Charlotte, Mich.

[73] Assignee: Midwest Water Resource, Inc., Charlotte, Mich.

[21] Appl. No.: 634,973

[22] Filed: Jan. 7, 1991

Related U.S. Application Data

[63] Continuation of Ser. No. 488,941, Mar. 5, 1990, abandoned.

[51] Int. Cl.$^5$ ............................................. E21B 43/04
[52] U.S. Cl. .................................. 166/278; 166/51
[58] Field of Search ............... 160/278, 51, 369, 370; 405/128, 258

[56] References Cited

U.S. PATENT DOCUMENTS

| | | | |
|---|---|---|---|
| 2,171,884 | 9/1939 | McLaine | 166/278 |
| 4,469,176 | 9/1984 | Zison et al. | 166/369 |
| 4,593,760 | 6/1986 | Visser et al. | 166/370 |
| 4,660,639 | 4/1987 | Visser et al. | 166/370 |
| 4,730,672 | 3/1988 | Payne | 166/267 |
| 4,890,673 | 1/1990 | Payne | 166/267 |

Primary Examiner—Bruce M. Kisliuk
Attorney, Agent, or Firm—Thomas J. Dodd

[57] ABSTRACT

A method of constructing a well into which conduit is inserted to inject air or to withdraw contaminated fluid from an underground plume. The method involves forming a borehole of a specified depth and partially filling the hole with a material of high fluid porosity. After the conduit is inserted into the borehole, the remainder of the hole is filled with the high porosity material and the well is surface capped to prevent leakage.

2 Claims, 1 Drawing Sheet

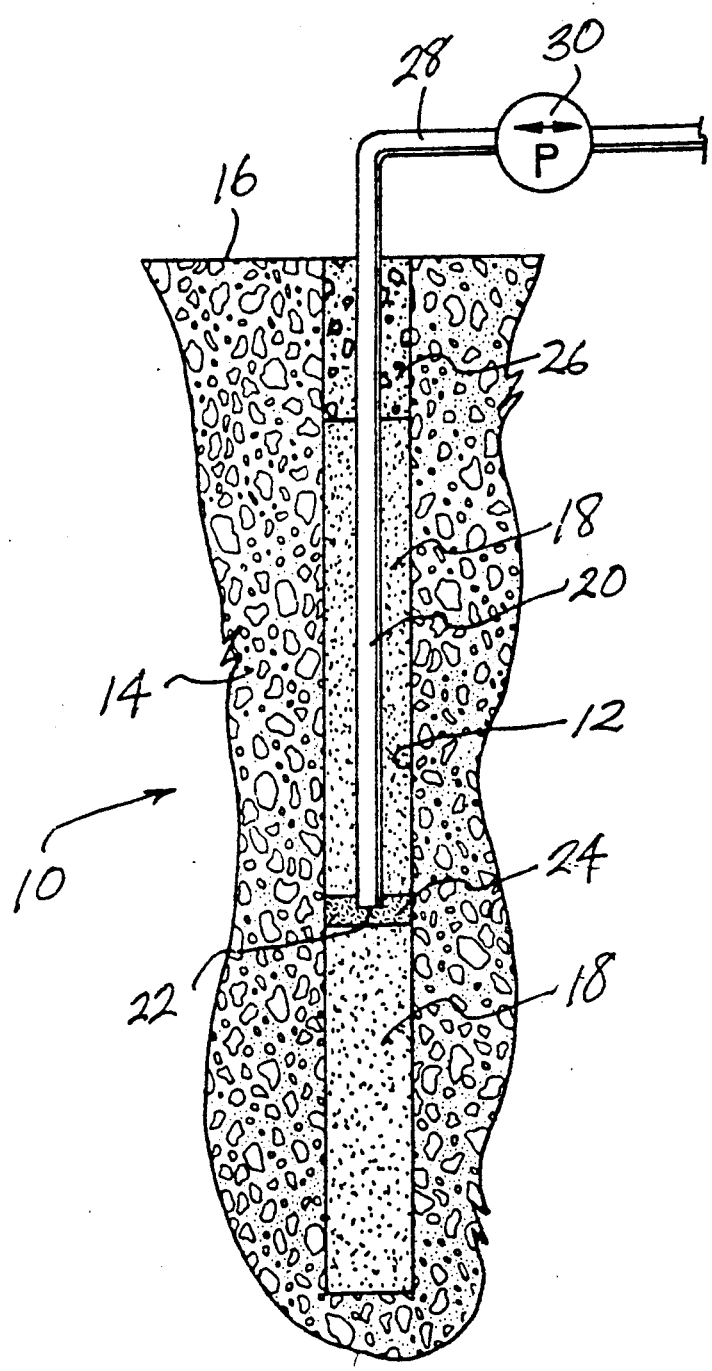
Fig

WELL CONSTRUCTION METHOD

This is a continuation of copending application Ser. No. 48,941 filed on Mar. 5, 1990, now abandoned.

FIELD OF THE INVENTION

This invention relates to wells and will have special application to a method of constructing a well which provides equal pressure distribution throughout the entire well depth.

BACKGROUND OF THE INVENTION

Vacuum extraction technology (VET) has recently become a highly popular process in chemical spill clean-ups. VET involves the drilling of extraction and injection wells in the area of the plume as shown in U.S. Pat. Nos. 4,593,760, 4,660,639, 4,730,672, and 4,890,673. The wells formed in these processes generally include a conduit which is inserted into the borehole with permeable and impermeable fill material packed around the conduit. In U.S. Pat. Nos. 4,593,760 and 4,660,639, a perforated conduit is utilized in the extraction wells to attempt to draw contaminants along the entire lower length of the conduit. In my U.S. Pat. Nos. 4,730,672 and 4,890,678, a conduit having a single bottom opening is used.

The well construction shown in these patents are not totally efficient in removing volatile organic contaminants (VOC) from the earth strata. Such constructions do not achieve equal fluid movement throughout the length of the borehole which results in extra wells being drilled at different depths to ensure that all VOC's are recovered. Further, these constructions encourage mobilization of the fill material into the pipe which can significantly slow the VOC recovery process.

SUMMARY OF THE INVENTION

The well construction of this invention includes a borehole of a specified depth which is at least partially filled with permeable fill. An imperforate pipe is inserted into the borehole with its open lower end terminating just above the fill level. More permeable fill is added and the top portion of the borehole is capped with impermeable grouting material. The conduit is connected at its upper end to a pump which either injects air into the strata to urge the VOC's toward the extraction well, or which draws the volatilized contaminants out of the earth as described in my U.S. Pat. Nos. 4,780,672 and 4,890,673. Filter material may be placed between the lower end of the pipe and the lower section of permeable fill to stabilize the fill against the lifting force of the fluid flow.

Accordingly, it is an object of this invention to provide for a novel method of forming a VOC recovery well.

Another method is to provide for a method of forming a well which equalizes fluid movement throughout the length of the well.

Another object is to provide for a method of forming a well which minimizes mobilization of fill material into the conduit.

Another object is to provide a more economical method of forming a well.

Other objects will become apparent upon a reading of the following

BRIEF DESCRIPTION OF THE DRAWING

FIG. 1 is a fragmented cross-sectional view of a section of earth which illustrates the construction of a well formed according to the principles of this invention.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to enable others skilled in the art to utilize its teachings.

FIG. 1 illustrates in cross-section a well 10 formed according to the principles of the method of this invention. Well 10 is preferably constructed for use in VOC recovery technology, as described in my U.S. Pat. Nos. 4,730,672 and 4,890,678 incorporated herein by reference. Well 10 could be used as either an extraction well or air reinjection well according to the teachings of these patents.

As shown in the drawing, well 10 is formed by establishing a borehole 12 in a section of the earth 14 which has been contaminated, and extends a predetermined distance below the ground level 16. The exact depth of borehole 12 is determined according to site conditions and site stratigraphy, using principles commonly known to those skilled in the art.

Fill material 18 is introduced into borehole 12 to approximately the midpoint of the active VOC recovery zone. Fill material 18 is preferably of a high fluid permeability and includes such coarse materials as pea gravel, among others. High-density packing material 24 is added to borehole 12 and rests in a thin layer atop fill material 18. Alternatively, packing 24 may be of a larger diameter than the opening of conduit 20. Conduit 20, which constitutes an open ended imperforate pipe is inserted into borehole 12 with conduit end 22 extending into packing 24.

The borehole 12 is then filled to the top of the active VOC recovery zone with more of the fill material 18. An impermeable grout 26 is then placed atop fill 18 as shown and extends preferably to ground level 16. All of the materials 18, 24 and 26 are commercially available materials known to those skilled in the art and are backfilled into borehole 12 using commercially known techniques.

In operation, well 10 is operated as described in my above-referenced U.S. Pat. Nos. Conduit 20 has its upper end 28 operatively coupled to pump 30 which draws fluid from earth 14 through conduit 20 and to a treatment station (not shown). Since borehole 12 is filled with permeable fill material is throughout the entire depth of the active VOC recovery zone, a constant or near-uniform reduced pressure area is present at all locations along the borehole to enhance recovery of the VOC's at all operating depths. Also, since packing 24 is of a larger diameter (or high density) than the opening into conduit 20, fill 18 and packing 24 is not drawn into the conduit. Finally, this method of constructing well 10 eliminates the need for well screens and/or segmented perforated pipes, which allows the well to be constructed at a much lower cost when compared to prior wells of this sort.

It is understood that the invention is not limited to the above-given details and may be modified within the scope of the following claims.

I claim:
1. A method of constructing a well comprising the steps of:
   (a) drilling a bore hole of a pre-determined depth into a sector of earth;
   (b) partially filling said bore hole with a fill material to form a layer which is highly fluid permeable;
   (c) packing said bore hole with a filter material on top of said fill material, said filter material constituting means for stabilizing said fill material against mobilization into an end of a conduit, then inserting a conduit into said bore hole to a depth terminating above that of said layer and into said filter material;
   (d) filling the remainder of said bore hole about said conduit with said fill material to substantially ground level; and
   (e) placing a fluid impermeable cap about said conduit to seal the bore hole against fluid leakage.

2. The method of claim 1 wherein said fill material includes pea gravel.

* * * * *